(12) United States Patent
Casey et al.

(10) Patent No.: US 10,250,922 B2
(45) Date of Patent: *Apr. 2, 2019

(54) INTELLIGENT VIDEO STREAMING SYSTEM

(71) Applicant: CenturyLink Intellectual Property LLC, Denver, CO (US)

(72) Inventors: Steven M. Casey, Littleton, CO (US); Mayur Kudtarkar, Lone Tree, CO (US); Nikhil Parikh, Lone Tree, CO (US); Felipe Castro, Erie, CO (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/815,503

(22) Filed: Nov. 16, 2017

(65) Prior Publication Data

US 2018/0091837 A1    Mar. 29, 2018

Related U.S. Application Data

(63) Continuation of application No. 14/884,559, filed on Oct. 15, 2015, now Pat. No. 9,838,725.

(60) Provisional application No. 62/153,315, filed on Apr. 27, 2015.

(51) Int. Cl.
*H04N 21/2343* (2011.01)
*H04N 21/2187* (2011.01)
*H04N 21/24* (2011.01)
*H04N 21/437* (2011.01)
*H04N 21/61* (2011.01)
*H04N 21/6405* (2011.01)

(52) U.S. Cl.
CPC .. *H04N 21/234309* (2013.01); *H04N 21/2187* (2013.01); *H04N 21/2405* (2013.01); *H04N 21/437* (2013.01); *H04N 21/6125* (2013.01); *H04N 21/6405* (2013.01)

(58) Field of Classification Search
CPC ....... H04N 21/234309; H04N 21/2187; H04N 21/2405; H04N 21/437; H04N 21/6125; H04N 21/6405
See application file for complete search history.

(56) References Cited

U.S. PATENT DOCUMENTS 8,325,821 B1    12/2012  Kizhepat et al.
8,775,648 B1     7/2014  Cassidy et al.
8,855,189 B1    10/2014  Krause et al.
(Continued)

*Primary Examiner* — Randy A Flynn
(74) *Attorney, Agent, or Firm* — Adsero IP

(57) ABSTRACT

A system for intelligent video streaming a video controller having at least one processor and non-transitory computer readable media having a set of instructions executable by the at least one processor to receive a playback request from a user device for a live stream, determine, from the playback request, whether source streaming content for the live stream is being transcoded, and allocate an available transcoder to transcode the source streaming content. The system further includes a transcoding having at least one processor and non-transitory computer readable media having a set of instructions executable by the at least one processor to join the multicast stream, retrieve the source streaming content, and transcode the source streaming content, and provide transcoded streaming content for delivery to the user device.

21 Claims, 8 Drawing Sheets

(56) References Cited

U.S. PATENT DOCUMENTS

| | | |
|---|---|---|
| 9,838,725 B2 | 12/2017 | Casey et al. |
| 2005/0117735 A1 | 6/2005 | Siedman |
| 2006/0200575 A1 | 9/2006 | Sherer et al. |
| 2009/0172752 A1 | 7/2009 | Lopatic |
| 2009/0310668 A1 | 12/2009 | Sackstein et al. |
| 2012/0266198 A1 | 10/2012 | Kanojia et al. |
| 2013/0054827 A1 | 2/2013 | Feher et al. |
| 2013/0091207 A1* | 4/2013 | Diab ............... H04W 4/21 709/204 |
| 2013/0132581 A1 | 5/2013 | Shafiee |
| 2013/0219001 A1 | 8/2013 | Velusamy |
| 2013/0219073 A1 | 8/2013 | Dong et al. |
| 2013/0312048 A1 | 11/2013 | Grossman |
| 2013/0343450 A1 | 12/2013 | Solka et al. |
| 2014/0089469 A1* | 3/2014 | Ramamurthy ... H04N 21/23435 709/219 |
| 2015/0020135 A1 | 1/2015 | Frusina et al. |
| 2015/0381690 A1 | 12/2015 | Schmidt et al. |
| 2016/0316234 A1 | 10/2016 | Casey et al. |

* cited by examiner

INTELLIGENT VIDEO STREAMING SYSTEM

CROSS-REFERENCES TO RELATED APPLICATIONS

This application is a continuation of U.S. patent application Ser. No. 14/884,559 filed Oct. 15, 2015 by Steven M. Casey et al., entitled, "Intelligent Video Streaming System," which claims priority to U.S. Provisional Patent Application Ser. No. 62/153,315, filed on Apr. 27, 2015 by Steven M. Casey et al., entitled, "Intelligent Video Streaming System," the disclosures of which are incorporated herein by reference, in its entirety, and for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to video streaming systems, and more particularly to allocation of streaming resources in dynamic environments.

BACKGROUND

Conventional content streaming systems today, live video streams, including live television and internet streaming, are transcoded continuously. The transcoder does not stop transcoding until it is turned off. Thus, even if no users are actually watching the video stream being transcoded, the transcoder will continue to transcode the video content to be streamed.

Conventional transcoding architectures employ a multicast router to receive, via multicast streams, source video signals from one or more streaming sources. The multicast router sends the source video to one or more transcoders for transcoding. Once transcoded, the transcoder sends the transcoded video content to a content distribution network (CDN) for distribution to users on their individual devices.

Under this framework, a multicast join request to join the multicast stream is generated immediately whenever a live channel is setup or when a new stream begins. However, even when the stream is not being viewed, resources needed to receive and transcode the source video content of the video stream are utilized in the background. Correspondingly, the transcoding process increases video traffic, bandwidth usage across a network for both receiving video for transcoding and transmitting the transcoded video, and resource usage for processing and transcoding video content that is not being viewed.

Thus, a more efficient system for intelligently allocating transcoding resources is provided by the embodiments described below.

BRIEF SUMMARY

According to a set of embodiments, a system, apparatus, and method for intelligent video streaming in a dynamically scalable environment are provided.

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible, and/or non-transitory computer readable media (such as, to name but a few examples, optical media, magnetic media, and/or the like).

In one aspect, a system for intelligent video streaming is provided. The system for intelligent video streaming includes a user device in communication with a service provider network, the user device generating a playback request for a live stream in response to a user selection to view a channel associated with live stream. A video controller is provided in communication with the user device may be provided and accessible over the service provider network. The video controller includes at least one processor, and non-transitory computer readable media having encoded thereon computer software comprising a set of instructions. The set of instructions are executable by the at least one processor to receive, from the user device, the playback request for the live stream, determine, from the playback request, whether source streaming content for the live stream is being transcoded, and allocate, in response to determining that the source streaming content is not being transcoded, an available transcoder from a pool of available transcoders to join the multicast stream and transcode the source streaming content. The available transcoder of the pool of available transcoders further includes at least one processor, and non-transitory computer readable media having encoded thereon a set of instructions. The set of instructions are executable by the at least one processor to generate a join request for the multicast stream of the source streaming content, join the multicast stream, retrieve, from the multicast stream, the source streaming content, transcode the source streaming content for viewing by the user device, and provide transcoded streaming content for delivery to the user device.

In one set of embodiments, the video controller may further include instructions to return, to the user device, in response to receiving the playback request, a pre-roll video playlist, wherein the pre-roll video playlist indicates one or more videos to be played before the requested stream is provided to the user device. In some embodiments, the pre-roll video playlist may include one or more of a dynamic advertisement, static advertisement, static video, or other live stream.

In another set of embodiments, the video controller may further include instructions to track how many transcoders of the pool of available transcoders are in use. In some embodiments, the video controller may include further instructions to generate an alert if a number of available transcoders in the pool of available transcoders falls below a threshold. In some further embodiments, the intelligent video streaming system may include at least one transcoder host machine, wherein the transcoders are virtualized transcoder instances hosted on the transcoder host machine. In these situations, the video controller may further include instructions to dynamically scale the number of virtualized transcoder instances provisioned on the at least one transcoder host machine according to load requirements.

In various embodiments, the video controller may further include instructions to assign idle transcoders in the pool of available transcoders to transcode at least one of video on demand content or adaptive bitrate streaming content, wherein the idle transcoder is an available transcoder that may be dynamically requested by the video controller, wherein in response to being requested, the idle transcoder will switch from transcoding the at least one of video on demand content or adaptive bitrate streaming content to transcoding the source streaming content for the content stream. In further embodiments, the video controller may further include instructions to determine that no user devices are viewing the transcoded streaming content of the live stream for a first threshold period, determine that no requests for the live stream have been received from any user devices for a second threshold period, and release the available transcoder, in response to determining that no user devices have viewed the transcoded streaming content of the live stream for the first threshold period, and that no requests for the live stream have been received for the second threshold period.

In another aspect, an intelligent video streaming controller is provided. The intelligent video streaming controller includes at least one processor, and non-transitory computer readable media having encoded thereon computer software comprising a set of instructions. The set of instructions are executable by the at least one processor to receive, from a user device, a playback request for a live stream associated with a channel selected by the user device. Based on the playback request, the video controller may determine whether the source streaming content for the live stream is being transcoded. In response to determining that the source streaming content is not being transcoded, an available transcoder is allocated from a pool of available transcoders. The video controller may further identify, based on the playback request, a multicast stream for the source streaming content. The video controller may then retrieve, via the transcoder, the source streaming content from the multicast stream, and transcode, via the available transcoder, the source streaming content, and provide, via the transcoder, transcoded streaming content for delivery to the user device.

In various embodiments, the video controller may include further instructions to return, to the user device, in response to receiving the playback request, a pre-roll video playlist, wherein the pre-roll video playlist indicates one or more videos to be played before the requested stream is provided to the user device.

In one set of embodiments, the video controller may further include instructions to track how many transcoders of the pool of available transcoders are in use. In some embodiments, the video controller may further include instructions to generate an alert if a number of available transcoders in the pool of available transcoders falls below a threshold. In further embodiments, the transcoders may be virtualized transcoder instances on a transcoder host machine, wherein the video controller further includes instructions to dynamically scale the number of virtualized transcoder instances provisioned on the at least one transcoder host machine according to load requirements.

In another set of embodiments, the video controller may further include instructions to assign idle transcoders in the pool of available transcoders to transcode at least one of video on demand content or adaptive bitrate streaming content, wherein the idle transcoder is an available transcoder that may be dynamically requested by the video controller, wherein in response to being requested, the idle transcoder will switch from transcoding the at least one of video on demand content or adaptive bitrate streaming content to transcoding the source streaming content for the content stream. In further embodiments, the video controller may include instructions to determine that no user devices are viewing the transcoded streaming content of the live stream for a first threshold period, determine that no requests for the live stream have been received from any user devices for a second threshold period, and release the available transcoder, in response to determining that no user devices have viewed the transcoded streaming content of the live stream for the first threshold period, and that no requests for the live stream have been received for the second threshold period.

In a further aspect a method for intelligent video streaming services is provided. The method for intelligent video streaming services includes receiving, at a video controller, a playback request for a live stream, the playback request generated by a user device in response to a selection to view a channel associated with the live stream. The video controller then determines, whether source streaming content for the live stream is being transcoded. In response to determining that the source streaming content is not being transcoded, an available transcoder is allocated from a pool of available transcoders. The available transcoder then retrieves the source streaming content from a multicast stream of the source streaming content. The available transcoder then transcoded the source streaming content for viewing by the user device. The transcoded streaming content is provided by the transcoder for delivery to the user device.

In one set of embodiments, the method may further include returning, via the video controller, in response to receiving the playback request, a pre-roll video playlist to the user device, wherein the pre-roll video playlist indicates one or more videos to be played before the requested stream is provided to the user device; and retrieving, with the user device, the one or more videos of the pre-roll video playlist.

In some further embodiments, the method includes providing a transcoder host machine, provisioning, via the transcoder host machine, one or more virtualized transcoder instances, tracking, with the video controller, virtualized transcoder instance usage, and scaling, at the transcoder host machine, the number of virtualized transcoder instances according to load requirements for additional virtualized transcoder instances. The transcoder host machine may host the pool of available transcoders, the pool of available transcoders having a plurality of virtualized transcoder instances including the available transcoder.

In another set of embodiments, the method may further include assigning, via the video controller, idle transcoders in the pool of available transcoders to transcode at least one of video on demand content or adaptive bitrate streaming content, wherein the idle transcoder is an available transcoder that may be dynamically requested by the video controller, wherein in response to being requested, the idle transcoder will switch from transcoding the at least one of video on demand content or adaptive bitrate streaming content to transcoding the source streaming content for the content stream.

In further embodiments, the method may include determining, with the video controller, that no user devices are viewing the transcoded streaming content of the live stream for a first threshold period. The video controller may then determine that no requests for the live stream have been received from any user devices for a second threshold period. In response to determining that no user devices have viewed the transcoded streaming content of the live stream for the first threshold period, and that no requests for the live stream have been received for the second threshold period, the video controller may release the available transcoder to the pool of available transcoders.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

While various aspects and features of certain embodiments have been summarized above, the following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers herein used to express quantities, dimensions, and so forth, should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Figure 1:
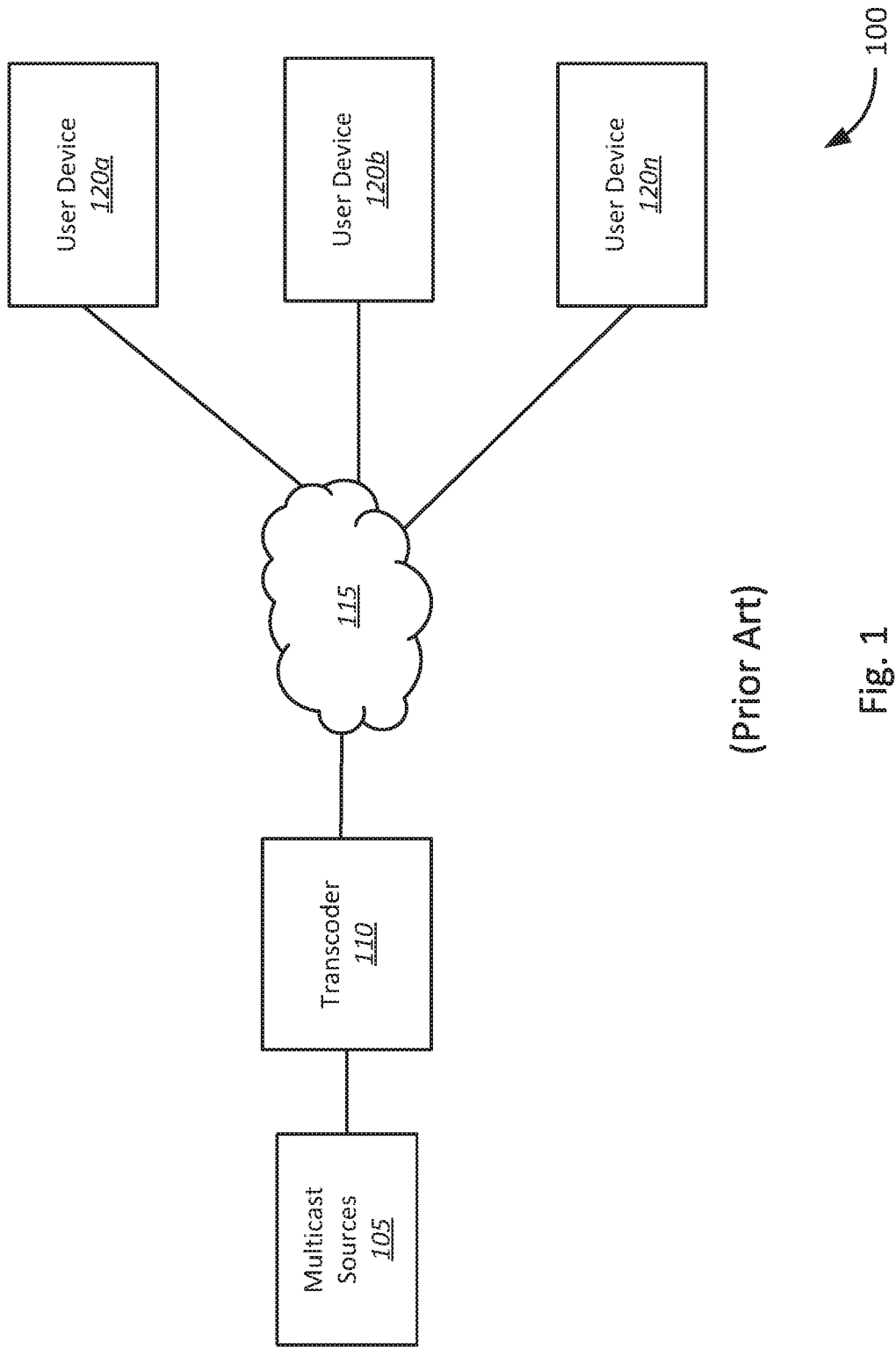
FIG. 1 is a system block diagram of a typical prior art streaming architecture, in accordance with various embodiments.

FIG. 1 illustrates an example of a prior art video streaming system 100. The system 100 includes multicast sources 105, a transcoder 110, network 115, and user devices 120a, 120b, 120n (120 collectively). Generally speaking, the user devices 120 are communicatively coupled, via network 115 to a transcoder, from which transcoded streaming content is received. The transcoder 110 is in further communication with one or more multicast sources 105 from which the transcoder 110 receives video content retrieved from a multicast stream provided by a content provider.

In a typical process flow utilizing the conventional transcoding system 100 architecture, the user device 120 requests live streaming video content, by accessing a channel or link to the streaming video content. In some variations, the request may be transmitted through a content distribution network (CDN) 115 to a distribution server or other request handling system. If the requested content is available on the distribution server, the requested streaming content is returned to the requesting user device 120.

In some variations, if the content is not available, the content request is then transmitted through CDN 115 to the transcoder 110. The transcoder 110 may then identify the source of the content being requested and generate a multicast join request to join a multicast stream of the multicast source 105 for the requested content. Alternatively, a multicast router may be utilized to generate the multicast join request to join the multicast stream. The multicast router may then retrieve the source video content from the multicast stream for distribution to the transcoder 110. The transcoder 110 may retrieve the requested content from the multicast router and begin transcoding the source video content. The transcoded source video content is then transmitted, via the CDN 115, back to the distribution server for distribution to the user device 120.

Normally, once a multicast stream is joined, the transcoder 115 will continue to transcode the retrieved source video content whether or not it is being viewed. Thus, the transcoder 115 resources may be tied up unnecessarily transcoding streaming content. Thus, prior art system 100 is not an efficient system for handling video transcoding, especially for live channels that are not frequently watched. As will be described with more detail with respect to FIGS. 2-5, an intelligent live streaming system is proposed. The intelligent live streaming system would increase efficiency and allow a service provider to have more channels available. Consequently, the intelligent live streaming system conserves the available capacity of a system, and reduces capital and operating costs of the system by providing, without limitation, at least the following: 1) reduction in how much equipment is needed; 2) reduction in the amount of time the equipment runs; and 3) reduction in network usage and bandwidth dedicated to supporting unnecessary streaming content.

Figure 2:
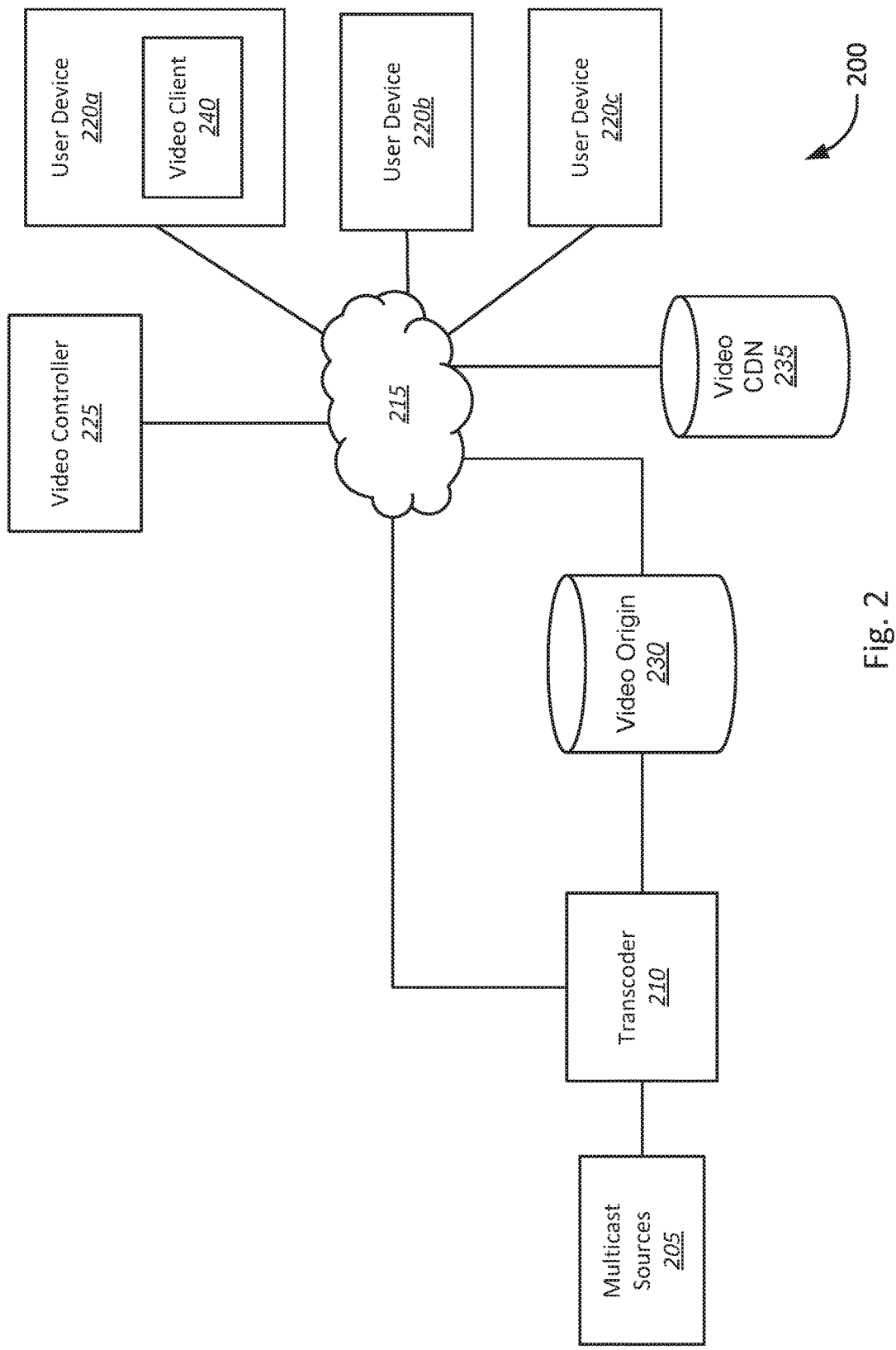
FIG. 2 is a block diagram of an intelligent video streaming system architecture, in accordance with various embodiments.

Accordingly, to address the shortcomings and inefficiencies of prior art systems 100, a solution is proposed where the join request for the multicast stream occurs dynamically, and resources to support the stream are allocated dynamically, as a user device actually accesses the channel or link for the live stream. FIG. 2 illustrates a system 200 for intelligent video streaming implementing one such solution, in accordance with various embodiments. The system 200 includes one or more multicast sources 205, transcoder 210, network 215, user devices 220a, 220b, 220c (220 collectively), video controller 225, video origin 230, and video CDN 235.

According to one set of embodiments, the user device 220 may be communicatively coupled to a video controller 225 and video CDN 235 over network 215. The video controller 225 may further be in communication with transcoder 210, via network 215. The transcoder 210 may in turn be communicatively coupled to multicast sources 205. The transcoder 210 may transmit transcoded streaming content to video origin 230, which in turn delivers the transcoded streaming content over network 215 to video CDN 235. The video CDN 235 may then deliver the streaming content over network 215 to a requesting user device 220. Each of the user devices 220 may further include a respective video client 240, allowing the customer to request and view streaming content through the user device 220.

In various embodiments, the user devices 220 may include any customer end device capable of receiving and displaying the transcoded streaming content. Therefore, the user devices 220 may include, without limitation, any of a personal computer, mobile device, smart phone, tablet, set-top box (STB), smart watch, residential gateway, media center, or other like device. Requests for streaming content may be transmitted by the user devices 220 and the requested streaming content may be delivered to the user devices 220 over network 215.

In various embodiments, the network 215 may include both wired and wireless communication networks. In some embodiments, network 215 may comprise some or all of a CDN network, such as video CDN 235, over which the streaming media content is distributed. In some further embodiments, the network 215 may represent multiple networks in the communication chain from the user device 220 to the video controller 225, video controller 225 to transcoder 210, and transcoder 210 to user devices 220. Accordingly, the network 215 may include, without limitation, a backbone network, CDN, service provider network, local area network, or any combination of the above, interconnecting the various elements of the system 200.

The transcoder 210 may be provided, in various embodiments, in different forms as appropriate in the context of the architecture of the embodiment in which the transcoder is implemented. For example, in various sets of embodiments, the transcoder 210 may be implemented as a dedicated hardware device, as a software component on existing hardware, such as a content server, distribution server, or other like element of a CDN. In further sets of embodiments, the transcoder 210 may be virtualized, implemented as a dedicated virtual machine running on a host machine, or as a software component of a virtual machine. In embodiments where the transcoder 210 is a virtualized transcoder, the number of virtualized transcoders, or virtual machines running transcoders, may be scaled up or down dynamically to meet demands for transcoding resources on the fly. In various embodiments, the video controller 225 may track the availability of transcoders in a pool of transcoders in real-time. In some embodiments, the video controller 225 may detect whether the number of available transcoders has dipped below an acceptable threshold level. In response, the video controller 225 may request that additional transcoders 210 be provisioned within the pool of transcoders.

In various embodiments, multicast sources 205 represent the source from which the transcoder 210 retrieves source streaming content for transcoding. The source streaming content may include one or both of streaming video and streaming audio content for a requested live stream. In one set of embodiments, the multicast sources 205 may be a content server of the content provider that provides a multicast stream for the source streaming content. In some embodiments, the multicast source 205 may be a multicast router, which may generate a join request to join the multicast stream. In one set of embodiments, the join request may be an Internet Group Management Protocol (IGMP) join request via multicast. Thus, the multicast router may retrieve the source streaming content from a multicast stream of a content provider content server, and make the source streaming content available to the transcoder 210. In both cases, the transcoder 210 then retrieves the source streaming content, from the multicast sources 205, for transcoding.

In various embodiments, the transcoder 210 communicates the transcoded streaming content to video origin 230. Thus, the video origin 230 may include any server or network element that transmits transcoded streaming content from the transcoder 210 over network 215, or makes the transcoded streaming content available over network 215. In one set of embodiments, the video origin 230 may be an origin server of a CDN from which the transcoded streaming content is pushed to various edge servers of the CDN for distribution further distribution to user devices 220a. Thus, in some embodiments, the video origin 230 may act as an origin server for one or more particular channel(s) or link(s). Accordingly, in some sets of embodiments, video CDN 235 may correspond to a distribution server, edge server, or other edge device of the CDN network 215 providing the transcoded streaming content to the requesting user device 220.

In one set of embodiments, a customer associated with user device 220a may access video client 240. The customer may request to view a live stream channel or access a link to a live stream through video client 240. The video client may include any client-side application, firmware, or other software component for accessing and viewing live streaming content. When a customer requests to view a channel or accesses a link to a live stream, the user device 220a may generate a playback request for the particular live stream. In one set of embodiments, the playback request may be generated via the video client 240. The playback request is then transmitted over network 215 to video controller 225. In some embodiments, the network 215 may include all or part of a service provider network that the video controller 225 is on. In other embodiments, the video controller 225 may only be accessible over the internet from user device 220a. Accordingly, in some embodiments, the network 215 may represent interconnections over multiple networks, such as a connection over the internet to the service provider network, through which video controller 225 may be reached by user device 220a.

Once the playback request is received by video controller 225, in some embodiments, the video controller 225 may return a pre-roll video playlist to the video client 240. The pre-roll video playlist may indicate to the video client 240, one or more videos to be played before the requested stream is returned to the video client 240. For example, in some embodiments, the pre-roll video playlist may indicate one or more of advertisements, a predetermined static video to played, a different live stream that may be available, or other video-on-demand (VOD) content. In various embodiments, the video controller 225 may further include a video controller profile described in more detail below with respect to FIG. 3. The video controller profile may indicate at the videos to be included in the pre-roll video playlist, among other settings.

In some embodiments, the videos on the pre-roll playlist may be pre-cached in the video CDN 235, for example, at an edge server providing service to the user device 220*a*. Accordingly, in response to receiving the pre-roll video playlist, the video client 240 may request from the video CDN 235, the one or more videos of the pre-roll video playlist. In various embodiments, the request may be handled by an edge server, or other edge device of the video CDN 235, on which one or more of the videos of the pre-roll video playlist are cached. The edge server or other edge device then returns the requested pre-roll video to the video client 240 to be played while the requested stream is retrieved and transcoded. After the videos on the pre-roll video playlist are requested, the video client 240 may then request the transcoded streaming video content from the video CDN 235. If the requested streaming video content is already transcoded and available on an edge server or other edge device of the video CDN 235, the edge server may be able to immediately return the transcoded streaming content requested by the video client 240. However, if the streaming video content has not yet been transcoded, the video CDN 235 may wait for the transcoded streaming content to become available while the videos on the pre-roll video playlist are played by the video client 240.

While the video client 240 and video CDN 235 handle the pre-roll video playlist operations, the video controller 225 may determine whether the requested live stream is already being transcoded. In embodiments where the live stream is already being transcoded, the video controller 225 may direct the video origin 230 to push the transcoded streaming content to the appropriate edge server of the video CDN 235. In further embodiments, if the transcoded streaming content is already available on the appropriate edge server of the video CDN 235, the video controller 225 may merely return the pre-roll video playlist and do nothing further. However, in other embodiments where the playback request from video client 240 is the first instance in which the live stream is requested, the video controller 225 may identify an available transcoder 210 from a pool of transcoders, and allocate the available transcoder 210 to retrieve and transcode source streaming content.

In one set of embodiments, the video controller 225 may create a stream profile in a video profile, indicating at least a stream address from which the transcoder 210, or multicast router, may join a multicast stream. In some embodiments, the video profile may be generated based on the playback request received by the video controller 225. In some cases, the stream address may be provided to the transcoder 210 from the video profile, while in others, the playback request may be forwarded to the transcoder 210. In other embodiments, the video controller 225 may directly indicate to the transcoder 210 the stream address of the live stream being requested by the video client 240. The transcoder 210 may then retrieve the source streaming content from multicast sources 205, and begin transcoding the source streaming content.

In various embodiments, the transcoded streaming content may be transmitted by the transcoder, as it is transcoded in real-time, to video origin 230, such as an origin server for the transcoded streaming content. In one set of embodiments, the origin server 230 may be a part of the video CDN 235. In other embodiments, the video origin 230 may be separate from the video CDN 235. In one set of embodiments, the transcoder 210 may unicast the transcoded streaming content to the video origin 230, such as a single origin server. In other embodiments, the transcoder 210 may multicast the transcoded streaming content to the video origin 230. For example, in some embodiments, the transcoder 210 may transmit the transcoded streaming content to multiple origin servers if multiple requests for the live stream were received, for example, from user device 120*b* and user device 120*n*. Accordingly, the transcoder 210 and/or video controller 225 may determine the appropriate origin servers to transmit the transcoded streaming content to most efficiently distribute the transcoded streaming content to each of the requesting user devices 120. This may be determined based on the locations of the customers associated with the user devices 120, and the organization of the video CDN 235.

Thus, the video origin 230 may transmit the transcoded streaming content over network 215 to video CDN 235. In this scenario, the video origin 230 may transmit the video to a separate origin server of the video CDN 235 to be distributed to the various edge servers or other edge devices of the video CDN 235 providing service to the video client 240. Accordingly, once the transcoded streaming content becomes available at the appropriate edge server of the video CDN 235, the edge server may return the transcoded streaming content associated with the requested live stream to the video client 240. In this manner, a dynamic stream of the requested live stream is created by the system 200 upon request by the customer associated with user device 220*a*.

It will be appreciated by those having skill in the art, that this process may be extended to each of the other user devices 220*b*, 220*n*, and that a similar procedure may be followed when other customers associated with the other user devices 220*b*, 220*n* access a channel or live stream link that is not actively being transcoded. Furthermore, as described above, those having skill in the art will appreciate that network 215 may include any combination of networks between user devices 220 and video controller 225, video controller 225 and transcoder 210, transcoder 210 and multicast sources 205, transcoder 210 and video origin 230, video origin 230 and video CDN 235, and video CDN 235 and user devices 220. Accordingly, in various embodiments, the network 215 may include, without limitation, all or part of networks such as a service provider network, a content distribution network, video CDN 235, a local area network associated with the customer, service provider, or content provider, a content provider network, or the internet.

In a further set of embodiments, the video controller 225 may monitor and determine whether the live stream is being viewed by any of the user devices 220. If the video controller 225 determines that the live stream is no longer being viewed, the video controller 225 may release the transcoder 210 transcoding the source streaming content back to the pool of available transcoders. Thus, the live stream may be shut down, and the transcoder 210 may be put back into an idle or standby state. In some embodiments, a the video controller 225 may track the amount of time that the live stream has not been viewed and release the transcoder 210 once a threshold amount of time has been reached that the live stream has not been viewed. In another set of embodiments, the video controller 225 may further determine whether any requests for the live stream have been received from the user devices. In one set of embodiments, the video controller 225 may again utilize a threshold to track how much time has elapsed from the most recent request for the live stream. Once the threshold has been reached, the video controller 225 may release the transcoder 210 back to the pool of available transcoders. In some embodiments, the video controller 225 may monitor both how long the live stream has not been viewed, and the time that has elapsed from the last request for the live stream. In these embodiments, the transcoder 210 may only be released once thresholds for both live stream viewing and live stream requests have been reached.

The various embodiments address the problems presented by current conventional video stream transcoding systems by providing a video controller 225 dedicated to managing and allocating stream transcoding resources dynamically, and on-demand, as they are requested by customers. By providing a system 200 and intelligent video streaming architecture as described above, the above described embodiments allow for the efficient and intelligent management of streaming and transcoding resources. For example, the video controller 225 allows for a live stream to be retrieved and transcoded dynamically, whereas in a conventional prior art system as described in FIG. 100, the transcoder automatically transcodes, and continues to transcode, any and all live streams made available by the service provider, without regard to whether or not the live stream is ever watched by a customer.

In the proposed embodiments, available transcoders 210 of the pool of transcoders may remain idle until a customer actually wants to view a channel or link of the live stream. This allows the system to be overprovisioned by 10% to 30%, depending on whether and how blocking is implemented on the live channels. Most customers today only ever watch a small number of channels at any given time. Therefore by implementing the system 200, the number of channels for which source streaming content must be processed can be significantly reduced. Thus, only a small core of commonly watched channels or live streams may be kept continuously active, while less active live streams may be created dynamically upon request, as a dynamic stream. Another consequence of the systemic changes introduced by the system 200 is that video traffic that needs to be sent to across the network(s) 215 is greatly reduced, as only the live streams that are actively being viewed are distributed to the end devices 220. In another set of embodiments, the idle transcoders of the pool of transcoders may be used for other processes within the intelligent streaming system 200, such as, without limitation, VOD transcoding, or packaging for adaptive bitrate (ABR) distributions of streaming content.

Figure 3:
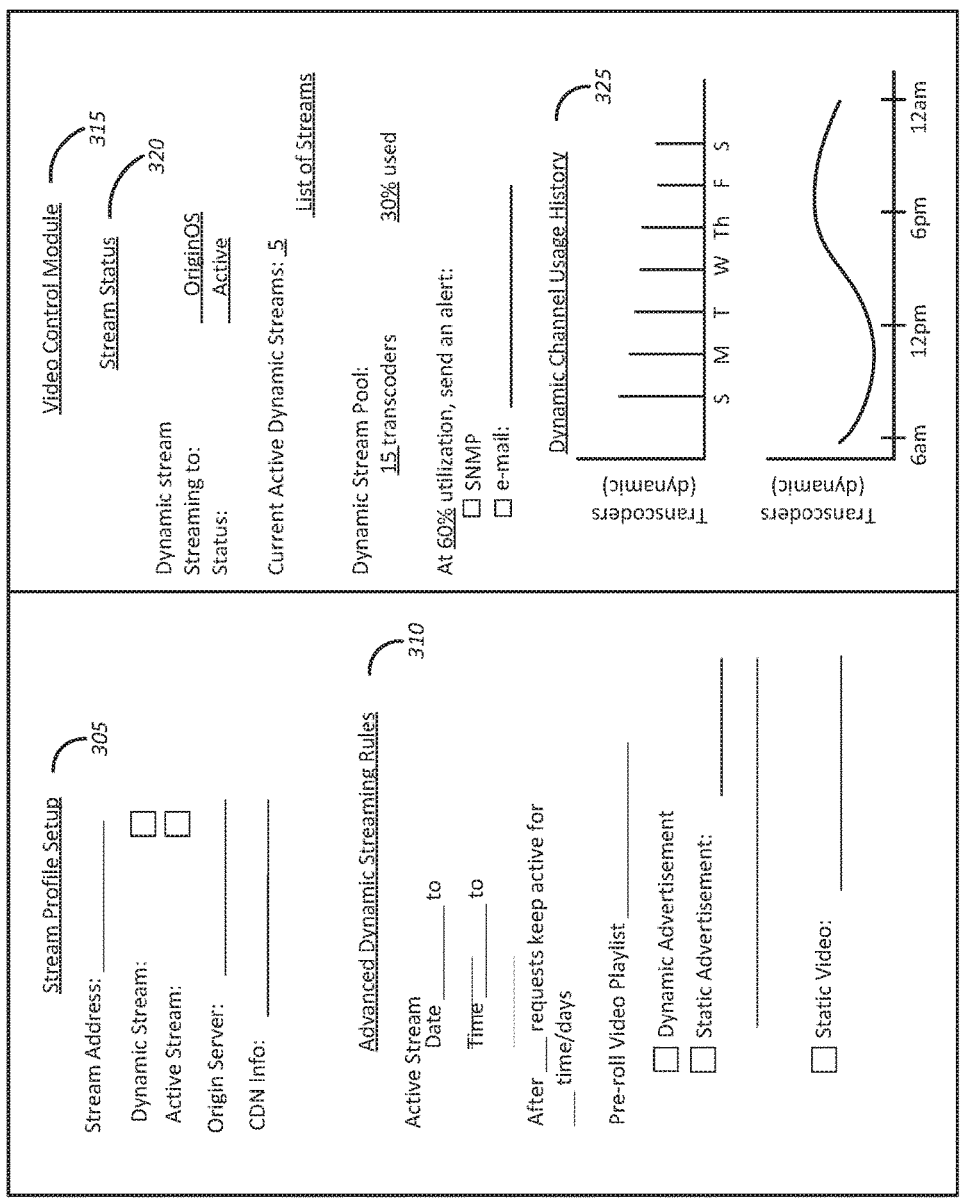
FIG. 3 is a video controller video profile screen, in accordance with various embodiments.

FIG. 3 depicts an exemplary user interface for viewing and editing a video controller video profile 300, in accordance with various embodiments. The embodiments are described with reference to elements in FIGS. 2 & 3. According to a set of embodiments, the video controller video profile 300 may include a stream profile setup 305, streaming rules 310, a video control module 315, live stream status information 320 and live stream usage analytics 325. In various embodiments, the video controller video profile 300 may be provided to interact with and receive input for the video controller 255 in FIG. 2. The video controller 255 may provide the video controller video profile 300 as part of an application running on an end device, a web application hosted on the video controller 255, a webpage or portal, or through other suitable means.

In various embodiments, access to the video controller video profile 300 may be restricted to service provider, or user originating within a service provider network. In further embodiments, one or more customers associated with end devices 220 may also have access to the video controller video profile 300, and the video controller video profile 300 may be accessed through the end devices 220 themselves. In other embodiments, the video controller video profile 300 may be accessible by content providers providing the live stream. In each of these various embodiments, the video controller video profile 300 may be accessible through a network 215 connection, such as the internet, local network of the video controller 225, or other suitable networks.

Merely by way of example, in some embodiments, the video controller 225 may be configured to communicate with a client computer accessing the video controller video profile 300 via a dedicated application running on the client computer; in this situation, the video controller video profile 300 might be displayed by the client computer, based on data and/or instructions provided by the video controller 225. In this situation, providing the video controller video profile 300 might comprise providing instructions and/or data to cause the client computer to display the video controller video profile 300.

In other embodiments, the user interface may be provided from a web site or portal, e.g., by providing a set of one or more web pages, which might be displayed in a web browser running on the client computer and/or might be served by a web server (not shown on FIG. 2). In various embodiments, the video controller 225 might comprise the web server and/or be in communication with the web server, such that the video controller 225 provides data to the web server to be incorporated in web pages served by the web server for reception and/or display by a browser at the client computer.

In various embodiments, the stream profile setup 305 may include specification of a stream address, and indication as to whether the stream is a dynamic stream to be created dynamically upon request, and whether the dynamic stream is an active stream already being transcoded by the transcoder. The stream profile setup 305 may also indicate the address of the video origin 230, such as a particular origin server, to which the transcoded streaming content is transmitted. The stream profile setup 305 may also indicate CDN information indicating the relevant CDN, specific CDN origin and distribution servers, or CDN edge servers to which the transcoded streaming content is provided.

The video controller video profile 300 may also provide the ability to define streaming rules 310 in the "Advanced Dynamic Streaming Rules" section. For an active stream, a date range and a time range may be set for which a specific live stream channel may be kept as an active stream. For example, in one instance, a live stream may be kept active from September 1 to December 1, from the hours of 11 AM to 4 PM. In some embodiments, the streaming rules may further specify when a dynamically provisioned live stream may be turned into an active stream. For example, a rule may provide that "after X requests for the live stream, the live stream will be kept active for Y amount of time." In further aspects, streaming rules 310 may be defined regarding the pre-roll video playlist to be returned by the video controller 225 to a requesting user device 220. The pre-roll video playlist may have a specific name or identifier. In one set of embodiments, streaming rules 310 may specify that a dynamic advertisement is to be played, a specific static advertisement to be played, or a static video to be played. In further embodiments, links to other streams, criteria for determining how dynamic advertisement is chosen, and other like options may be included within streaming rules 310.

In the video control module 315, information about particular live stream status 320, and live stream usage analytics 325 may be provided within video controller video profile 300. The live stream status 320 may indicate information about the viewing and usage of live streams by customers and user devices 220 across the service provider network. The live stream status 320 may also contain rules pertaining to the streaming and transcoding system. For example, the live stream status 320 may include information regarding a destination server of the dynamic stream, a status of the destination server, the current number of dynamic live streams that are active. The stream status 320 may further indicate the number of remaining transcoders in the pool of available transcoders for transcoding of dynamic streams. In various embodiments, a rule may be set such that an alert may be generated when a threshold percentage of transcoders in the pool of available transcoders are in use. For example, as depicted, in one example, at 60% utilization of transcoders in the pool of available transcoders, an alert may be generated in the form of a Simple Network Management Protocol (SNMP) alert message or e-mail.

In various embodiments, the video control module 315 may further include live stream usage analytics 325. Live stream usage analytics 325 may include, without limitation, analytics information on resource usage, viewing history, stream-specific data, transcoder usage data, and other similar analytics information regarding the live streaming system. Live stream usage analytics 325 may be presented in various forms, including, without limitation, tables, lists, summaries, graphs, and charts among other suitable forms for presenting the analytics data. In one set of embodiments, the live stream usage analytics 325 may include a "Dynamic Channel Usage History" section displaying graphs of transcoder usage by day of the week, and transcoder usage by time of day. Although only two graphs are depicted, it is to be understood variations may be present on how much of and what analytics data is presented, and how the data is displayed.

Figure 4A:
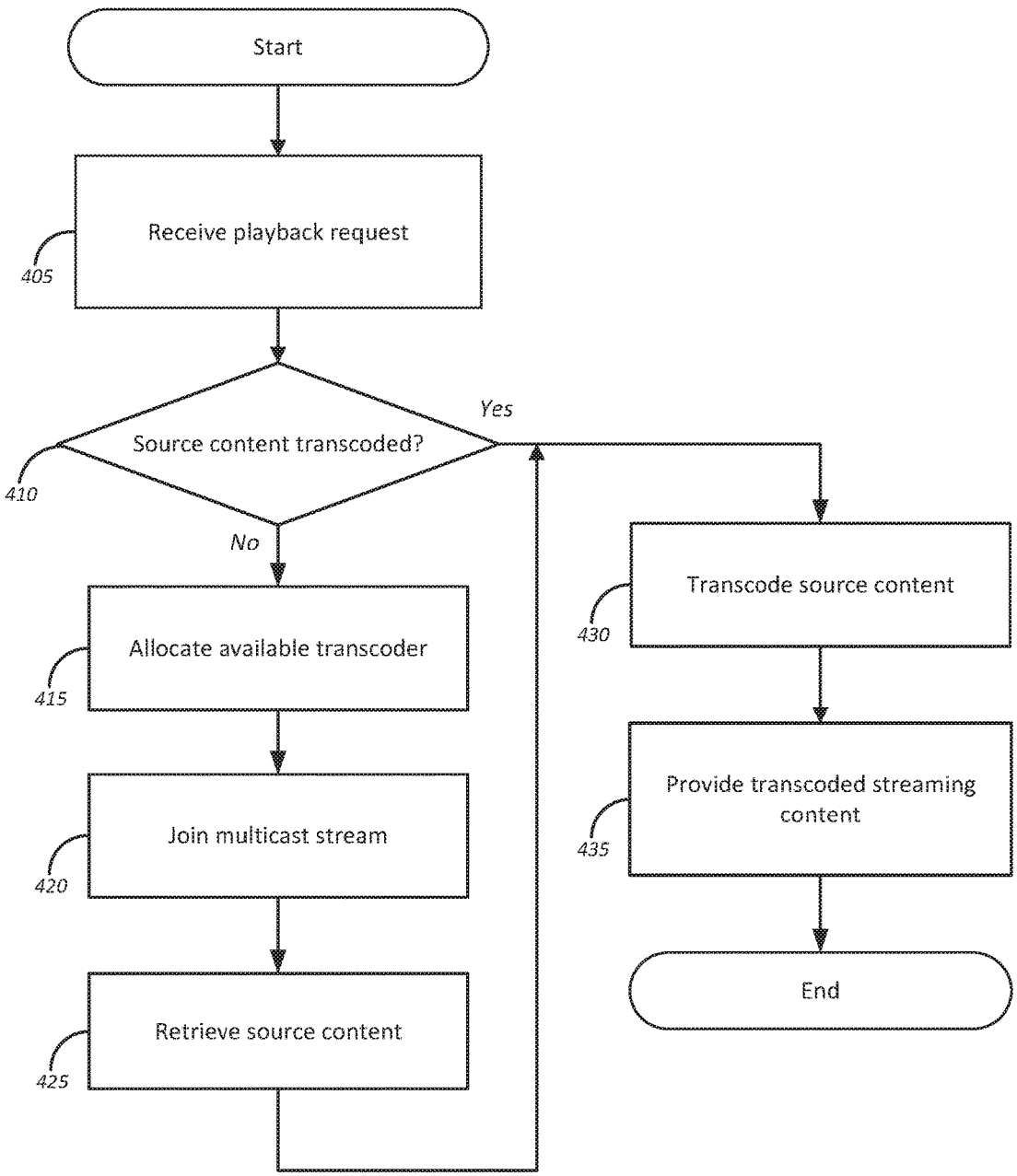
FIG. 4A is a flow diagram of a method for intelligent video streaming, in accordance with various embodiments.

FIG. 4A is a flow diagram of a method 400A of intelligent video streaming, in accordance with various embodiments. The method 400A begins at block 405, where a playback request is received by the video controller. In various embodiments, the playback request may be generated by a video client application running on a user device when a customer associated with the user device selects a channel or link to view a live stream. The user device may then transmit the playback request, over a network connection, to a video controller. In some embodiments, the playback request may include, without limitation, a stream address for the live stream from which source streaming content may be retrieved, a stream identifier such as the name of the stream, and identifying information regarding the customer, user device, or video client making the playback request.

At decision block 410, the video controller may determine whether a source streaming content of the live stream is already being transcoded. In embodiments where the live stream is already being transcoded, the video controller may direct an origin server or distribution server to push the transcoded streaming content to the appropriate edge server of a video CDN serving the requesting device. In further embodiments, if the transcoded streaming content is already available on the appropriate edge server of the video CDN, the video controller may simply allow the user device to retrieve the transcoded streaming content from the edge server. In some embodiments, the video controller may return a server address of the edge server having the transcoded streaming content requested. In some embodiments, the video controller may update a most recently received request for the live stream, and continue transcoding source streaming content for a live stream that may otherwise have been discontinued. However, in other embodiments where the playback request from the user device, or video client running on the user device, is the first instance in which the live stream is requested, the video controller may determine that the source streaming content is not currently being transcoded.

If the source streaming content is not already being transcoded, at block 415, the video controller may allocate an available transcoder. In various embodiments, the video controller may identify an available transcoder from a pool of available transcoders. In various embodiments, the video controller may directly allocate the available transcoder for transcoding of the requested live stream. In other embodiments, the video controller may generate a separate request for an available transcoder to be assigned to transcoding the requested live stream.

At block 420, a multicast stream of the requested live stream may be joined. In various embodiments, a content provider may provide source streaming content through a multicast stream. In one set of embodiment, a multicast router may be provided to generate a join request, and join the multicast stream to retrieve the source streaming content. The multicast router may then be in further communication with the transcoder. In other embodiments, the transcoder itself may be able to generate a join request to join the multicast stream. In one set of embodiments, the video controller may create a stream profile in a video controller video profile. In some embodiments, the video profile may be created based on or in response to receiving the playback request. The video profile may indicate at least a stream address from which a transcoder or multicast router may join the multicast stream. In other embodiments, the video controller may directly indicate to the transcoder the address of the stream being requested by the video client of a user device. Although the embodiments have been described with respect to joining a multicast stream, it will be appreciated by those having skill in the art that other embodiments need not be limited to multicasting addressing schemes, and that other addressing and routing techniques may be implemented without departing from the scope of the disclosed embodiments. For example, in various other embodiments, the source streaming content may requested from a content provider's servers and retrieved from the content provider server(s) in a unicast manner.

At block 425, the source streaming content is retrieved by the transcoder. In some embodiments, the source streaming content may be retrieved by the transcoder from a multicast router that receives the source streaming content via the multicast stream provided by the content provider. In other embodiments, the transcoder may directly retrieve the source streaming content in a unicast fashion, or from the multicast stream. Once retrieved, the transcoder may proceed, at block 430, to transcode the source streaming content. Similarly, if the video controller determines, at decision block 410, that the source streaming content is already being transcoded, the video controller may direct the transcoder to continue transcoding the source streaming content in response to receiving the playback request. In further embodiments, the video controller may reset a threshold time from when the last request for the live stream was received.

At block 435, the transcoded streaming content may be provided to the requesting user device. In various embodiments, the transcoded streaming content may be provided to a video origin such as an origin server. In some embodiments, the origin server may be located or be in communication with a CDN, over which the origin server provides the transcoded streaming content to one or more edge routers of the CDN. In other embodiments, the video origin may be a server, separate from the CDN that receives the transcoded streaming content and separately transmits the transcoded streaming content to an origin server of the CDN for further distribution to an edge server of the CDN. Once the transcoded streaming content reaches the appropriate edge server, the edge server may return the transcoded streaming content to the requesting user device. In various embodiments, the user device may directly request the live stream from the edge server, after transmitting the playback request to the video controller. In some embodiments, the video controller may return a server address of the edge router to the user device in response to receiving the playback request. In other embodiments, the edge router may be assigned to service the user device and the transcoded streaming content may simply be transmitted to the assigned edge router to provide to the requesting user device.

Figure 4B:
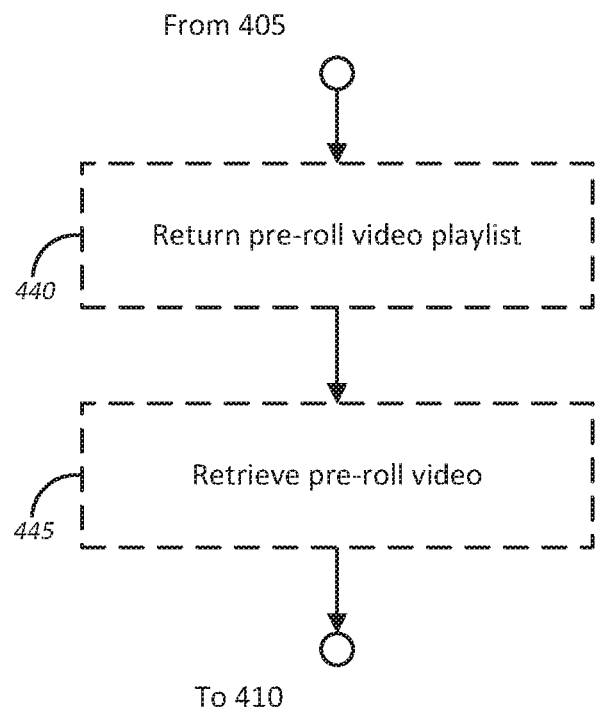
FIG. 4B is a flow diagram of additional optional processes in a method for intelligent video streaming, in accordance with various embodiments.

FIG. 4B is a flow diagram of additional optional processes 400B in a method of intelligent video streaming, in accordance with various embodiments. The optional processes proceed from when, at block 405, the playback request is received from the video controller. At optional block 440, in response to receiving the playback request, the video controller may return a pre-roll video playlist. In various embodiments, the pre-roll video playlist may indicate one or more videos to be played before the requested live stream is returned to the requesting video client/user device. For example, in some embodiments, the pre-roll video playlist may indicate one or more of static advertisements, dynamic advertisements, a predetermined static video, a different live stream from the one presented, a manifest stitching (.m3u8) playlist, or other video-on-demand (VOD) content.

At optional block 445, the video client then retrieves the pre-roll video. In one set of embodiments, the videos on the pre-roll playlist may be pre-cached in a CDN, for example, at an edge server providing service to the requesting video client/user device. Accordingly, in response to receiving the pre-roll video playlist, the video client may request from one or more pre-roll videos of the pre-roll video playlist from the appropriate CDN edge router. In some embodiments, the CDN edge router may retrieve the requested pre-roll video from an origin server of the CDN. In various embodiments, the pre-roll video playlist may indicate, to the video client, the address of the appropriate edge server or origin server from which to the one or more pre-roll videos of the pre-roll video playlist may be retrieved.

Figure 4C:
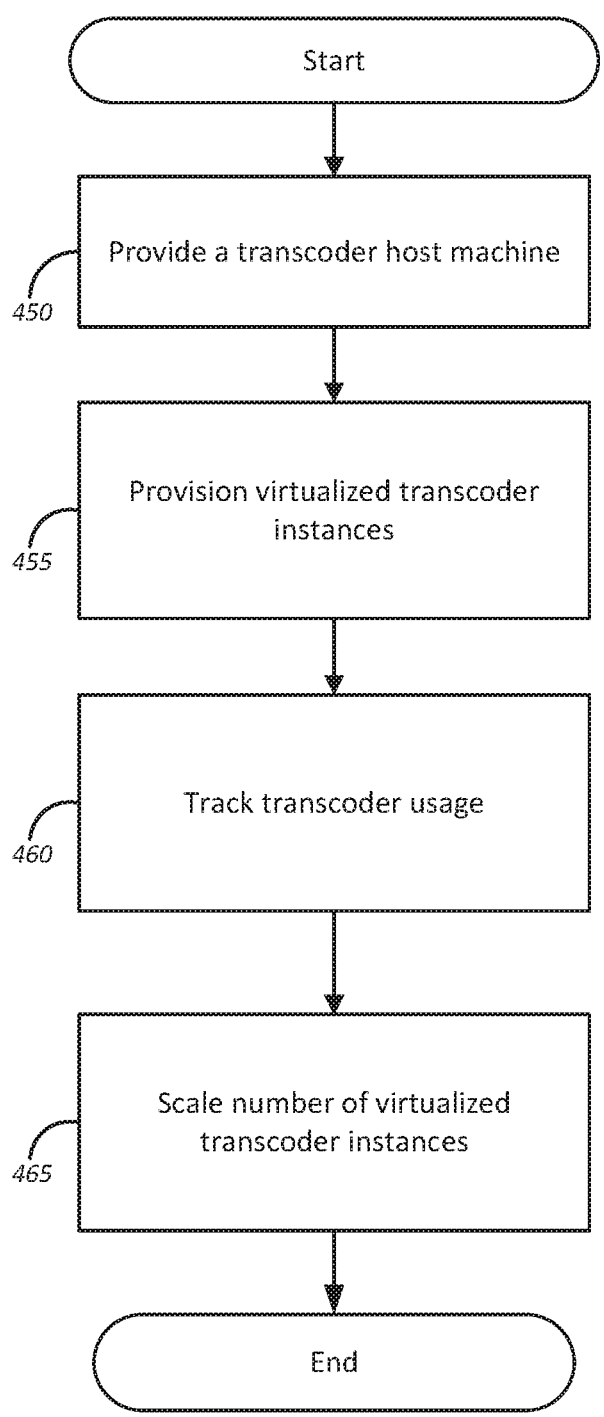
FIG. 4C is a flow diagram for tracking and scaling available transcoders in a method for intelligent video streaming, in accordance with various embodiments.

FIG. 4C is a process flow for additional processes 400C to track and scale available transcoders in a method for intelligent video streaming involving virtualized transcoders, in accordance with various embodiments. The method 400C begins at block 450, where a transcoder host machine is provided. In various embodiments, the transcoder host machine may be a host server computer capable of running multiple virtual machine instances. Thus, the transcoder host machine may host one or more virtualized transcoder instances as either dedicated virtualized hardware, or generic virtual machine instances capable of performing transcoding of the source streaming content.

At block 455 virtualized transcoder instances may be provisioned by the transcoder host machine. In various embodiments, the virtualized transcoder instances may be implemented as dedicated virtualized hardware, or as part of a virtual machine providing transcoding capabilities. In various embodiments, a predetermined number of virtualized transcoder instances may initially be provisioned. In some embodiments, the number of virtualized transcoder instances may be based on the number of static channels determined by a service provider to be made available continuously, and a number of additional virtualized transcoder instances may be provisioned to support the number of dynamic streams anticipated to be requested by customers at a given time. Thus, a virtualized transcoder instance may not need to be provisioned for every single live stream supported by the service provider.

At block 460, the usage of the virtualized transcoder instances may be tracked. In various embodiments, the video controller may be in communication with a network orchestrator or the transcoder host machine. The video controller may be able to track the remaining number of transcoders in a pool of available transcoders as transcoders are assigned to transcode specific streams in real-time.

At block 465, the number of virtualized transcoder instances may be scaled according to the load requirements at a given time. In one set of embodiments, when the remaining number of available transcoders falls below a threshold level, the video controller may be able to request more transcoders to be made available. In some embodiments, the video controller may direct a transcoder host machine, or network orchestrator, to instantiate more virtualized transcoder instances. Inversely, in some embodiments, the video controller may monitor the number of transcoders to determine whether the number of available transcoders exceeds an upper threshold. If the upper threshold is reached, the video controller may dynamically reduce the number of available transcoders in the pool of available transcoders.

Figure 4D:
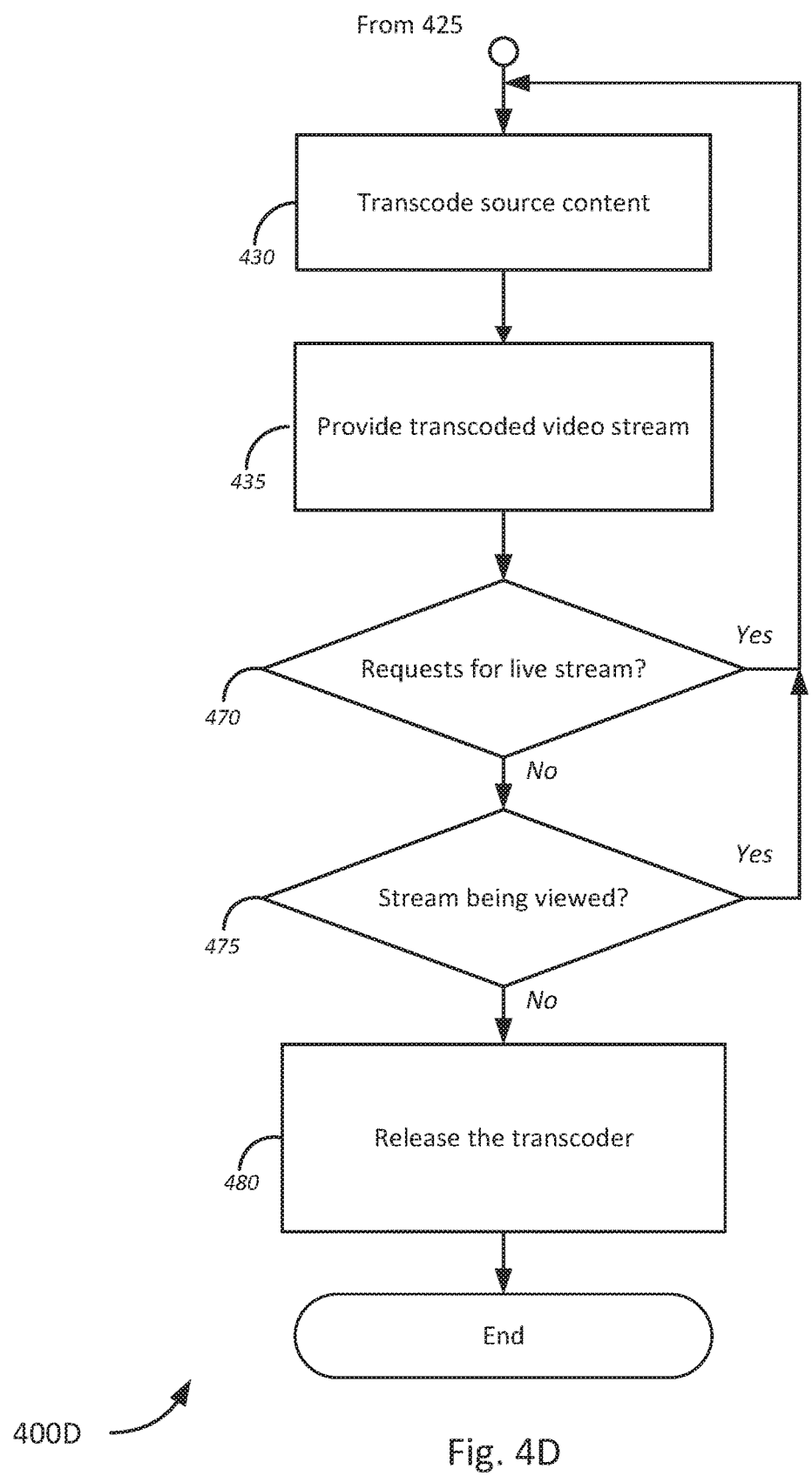
FIG. 4D is a flow diagram for releasing transcoders in a method for intelligent video streaming, in accordance with various embodiments.

FIG. 4D is a process flow for releasing transcoders 400D in a method for intelligent video streaming, in accordance with various embodiments. The method 400D begins at block 430, where, as in FIG. 4A, the source streaming content is transcoded, and the transcoded stream is provided to the requesting video client or user device, at block 435.

At decision block 470, the video controller may determine whether any new requests for the live stream have been received. In various embodiments, the video controller may check periodically to determine the last time that a request for the live stream was received. If a threshold amount of time has not elapsed since the last request for the live stream, the video controller may recognize that the request for the live stream is still active. If the request for the live stream is still active, the video controller may then, at block 430, direct the transcoder to continue transcoding the source streaming content and provide the transcoded streaming content to the requesting video client or user device, at block 435.

If a threshold amount of time has elapsed since the last time a request for the live stream was received, the video controller may then, at decision block 475, determine whether the stream is currently being viewed. In one set of embodiments, the video controller may determine, directly via the video clients, whether the live stream is being viewed at any of the video clients. In other embodiments, the video controller may determine whether the live stream is being viewed via CDN origin servers or CDN edge servers. In another set of embodiments, the video clients themselves may report, to the video controller, when they are no longer accessing the live stream. In other embodiments, the CDN edge device or CDN origin server may indicate that no devices are viewing the live stream to the video controller. If the live stream is actively being viewed, the video controller may then, at block 430, direct the transcoder to continue transcoding the source streaming content and provide the transcoded streaming content to the requesting video client or user device, at block 435.

At block 480, if the video controller determines that the live stream is not being viewed by any video clients, the video controller may release the transcoder and return it to the pool of available transcoders. In various embodiments, the transcoder may then be assigned, by the video controller, to transcode other live streams. In some embodiments, the transcoder may be utilized, like other idle transcoders in the pool of available transcoders, for other processes within the intelligent streaming system, such as, without limitation, VOD transcoding, or packaging for ABR distributions of streaming content.

Figure 5:
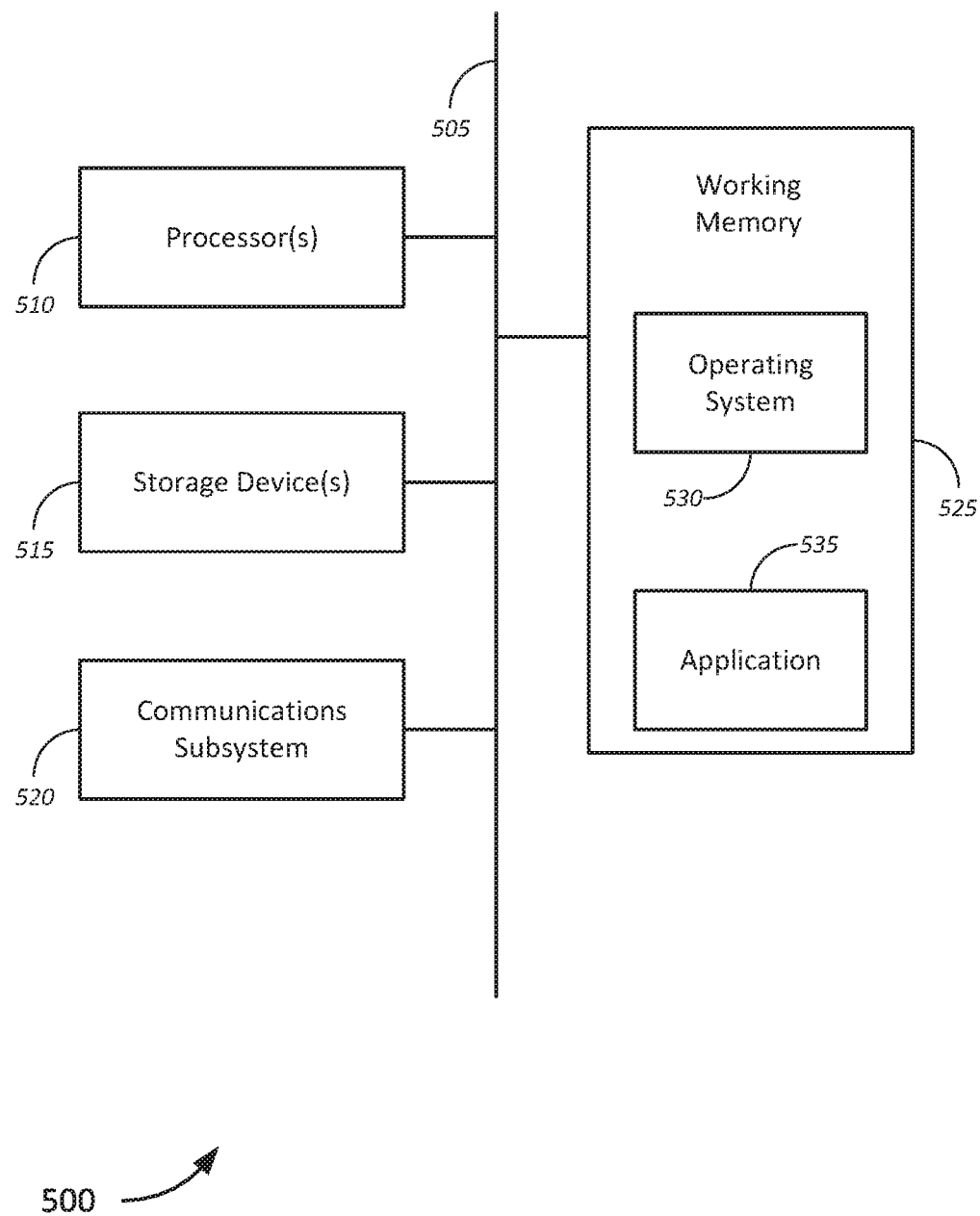
FIG. 5 is a schematic block diagram of computer hardware for a license manager, in accordance with various embodiments.

FIG. 5 is a schematic block diagram of a computer architecture for a video controller, in accordance with various embodiments. FIG. 5 provides a schematic illustration of one embodiment of a computer system 500 that can perform the methods provided by various other embodiments, as described herein, and/or can perform the functions of the user device, video controller, transcoder, or any other computer systems as described above. It should be noted that FIG. 5 is meant only to provide a generalized illustration of various components, of which one or more (or none) of each may be utilized as appropriate. FIG. 5, therefore, broadly illustrates how individual system elements may be implemented in a relatively separated or integrated manner.

The computer system 500 includes a plurality of hardware elements that can be electrically coupled via a bus 505 (or may otherwise be in communication, as appropriate). The hardware elements may include one or more processors 510, including, without limitation, one or more general-purpose processors and/or one or more special-purpose processors (such as digital signal processing chips, graphics acceleration processors, and/or the like). In general, embodiments can employ as a processor any device, or combination of devices, that can operate to execute instructions to perform functions as described herein. Merely by way of example, and without limitation, any microprocessor (also sometimes referred to as a central processing unit, or "CPU") can be used as a processor, including without limitation one or more complex instruction set computing ("CISC") microprocessors, such as the single core and multicore processors available from Intel Corporation™ and others, such as Intel's X86 platform, including, e.g., the Pentium™, Core™, and Xeon™ lines of processors. Additionally and/or alternatively, reduced instruction set computing ("RISC") microprocessors, such as the IBM Power™ line of processors, processors employing chip designs by ARM Holdings™, and others can be used in many embodiments. In further embodiments, a processor might be a microcontroller, embedded processor, embedded system, system on a chip ("SoC") or the like.

As used herein, the term "processor" can mean a single processor or processor core (of any type) or a plurality of processors or processor cores (again, of any type) operating individually or in concert. Merely by way of example, the computer system 500 might include a general-purpose processor having multiple cores, a digital signal processor, and a graphics acceleration processor. In other cases, the computer system might 500 might include a CPU for general purpose tasks and one or more embedded systems or microcontrollers, for example, to run real-time functions. The functionality described herein can be allocated among the various processors or processor cores as needed for specific implementations. Thus, it should be noted that, while various examples of processors 510 have been described herein for illustrative purposes, these examples should not be considered limiting.

The computer system 500 may further include, or be in communication with, one or more storage devices 515. The one or more storage devices 615 can comprise, without limitation, local and/or network accessible storage, or can include, without limitation, a disk drive, a drive array, an optical storage device, a solid-state drive, flash-based storage, or other solid-state storage device. The solid-state storage device can include, but is not limited to, one or more of a random access memory ("RAM") or a read-only memory ("ROM"), which can be programmable, flash-updateable, or the like. Such storage devices may be configured to implement any appropriate data stores, including, without limitation, various file systems, database structures, or the like.

The computer system 500 might also include a communications subsystem 520, which can include, without limitation, a modem, a network card (wireless or wired), a wireless programmable radio, or a wireless communication device. Wireless communication devices may further include, without limitation, a Bluetooth device, an 802.11 device, a WiFi device, a WiMax device, a WWAN device, cellular communication facilities, or the like. The communications subsystem 520 may permit data to be exchanged with a customer premises, residential gateway, authentication server, a customer facing cloud server, network orchestrator, host machine servers, other network elements, or combination of the above devices, as described above. Communications subsystem 520 may also permit data to be exchanged with other computer systems, and/or with any other devices described herein, or with any combination of network, systems, and devices. According to some embodiments, the network might include a local area network ("LAN"), including without limitation a fiber network, or an Ethernet network; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth protocol, or any other wireless protocol; or any combination of these or other networks.

In many embodiments, the computer system 500 will further comprise a working memory 525, which can include a RAM or ROM device, as described above. The computer system 500 also may comprise software elements, shown as being currently located within the working memory 525, including an operating system 530, device drivers, executable libraries, and/or other code. The software elements may include one or more application programs 535, which may comprise computer programs provided by various embodiments, and/or may be designed to implement methods and/or configure systems provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program, configure and/or adapt a general purpose computer with the instructions/code stored thereon. These instructions might take the form of executable code, which is executable by the computer system 500 and/or might take the form of source and/or installable code, which, upon compilation and/or installation on the computer system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 500) to perform methods in accordance with various embodiments of the invention. According to a set of embodiments, some or all of the procedures of such methods are performed by the computer system 500 in response to processor 510 executing one or more sequences of one or more instructions (which might be incorporated into the operating system 530 and/or other code, such as an application program 535) contained in the working memory 525. Such instructions may be read into the working memory 525 from another computer readable medium, such as one or more of the storage device(s) 515. Merely by way of example, execution of the sequences of instructions contained in the working memory 525 might cause the processor(s) 510 to perform one or more procedures of the methods described herein.

The terms "machine readable medium" and "computer readable medium," as used herein, refer to any medium that participates in providing data that causes a machine to operation in a specific fashion. In an embodiment implemented using the computer system 500, various computer readable media might be involved in providing instructions/code to processor(s) 510 for execution and/or might be used to store and/or carry such instructions/code (e.g., as signals). In many implementations, a computer readable medium is a non-transitory, physical and/or tangible storage medium. In some embodiments, a computer readable medium may take many forms, including but not limited to, non-volatile media, volatile media, or the like. Non-volatile media includes, for example, optical and/or magnetic disks, such as the storage device(s) 515. Volatile media includes, without limitation, dynamic memory, such as the working memory 525.

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 500. These signals, which might be in the form of electromagnetic signals, acoustic signals, optical signals and/or the like, are all examples of carrier waves on which instructions can be encoded, in accordance with various embodiments of the invention.

The communications subsystem 520 (and/or components thereof) generally will receive the signals, and the bus 505 then might carry the signals (and/or the data, instructions, etc. carried by the signals) to the processor(s) 510, or working memory 525, from which the processor(s) 510 retrieves and executes the instructions. The instructions received by the working memory 525 may optionally be stored on a storage device 515 either before or after execution by the processor(s) 510.

According to a set of embodiments, the computer system 500 may be a video controller having access to, and in communication with, one or more video clients, user devices, and transcoders. In various embodiments, each of the one or more user devices and transcoders may themselves include one or more hardware elements similar to computer system 500. The computer system 500 may then receive a playback request for a channel or link to a live stream, via the communications subsystem 520, from a video client of the one or more user devices. The computer system 500 may also be in communication with a transcoder or pool of available transcoders via communications subsystem 520. In response to receiving the playback request, the computer system 500 the computer system 500 may include computer readable media, having stored thereon a plurality of instructions, which, when executed by the processor 510, allows the computer system 500 to allocate an available transcoder from the pool of available transcoders.

In various embodiments, the computer system 500 may further return, to the requesting video client, a pre-roll video playlist. Once a transcoder has been allocated, the computer system 500 may direct the transcoder to retrieve source streaming content from a stream address or provide the stream address to a multicast router to retrieve the source streaming content from the stream address. In various embodiments, the stream address may be determined from the playback request itself.

In one set of embodiments, the computer system 500 may further include, in a video controller video profile with information regarding the requested live stream, as well as usage statistics for the overall intelligent live streaming environment. The computer system 500 may further indicate to the transcoder, or separate video origin, information regarding the CDN, or specific CDN origin server to which the transcoded streaming content should be transmitted.

In various embodiments, the computer system 500 may include instructions 535, which, when executed by processor 510, cause the processor 510 to track transcoder usage in the pool of available transcoders. In one set of embodiments, the transcoders may be virtualized in the form of virtualized transcoder instances running on transcoder host machines. In various embodiments, the computer system 500 may further execute instructions to determine whether the number of available transcoders in the pool of available transcoders has fallen below the lower threshold, or if the number of available transcoders has exceeded an upper threshold. If the lower threshold has been met, the computer system 500 may further execute instructions to direct the transcoder host machine to scale the number of virtualized transcoder instances to meet the need, and provision further virtualized transcoder instances. If the upper threshold has been exceeded, the computer system 500 may inversely execute instructions to direct the transcoder host machine to decrease the number of available virtualized transcoder instances. In some embodiments, the computer system 500 may alternatively communicate these commands to a network orchestrator, which in turn communicates directly with the transcoder host machine(s).

In a further set of embodiments, the computer system 500 may further include instructions 535, executable by the processor 510, to track the most recent request for a live stream, and whether the live stream is actively being viewed. When tracking the most recent request for the live stream, the computer system 500 may track the amount of time that has elapsed since the last time a request for the live stream was received. Similarly, when tracking whether a live stream is actively being viewed, the computer system may track the amount of time that has elapsed since the last time the live stream was viewed. The elapsed time may then be compared to a threshold. If the elapsed time has exceeded the threshold, the computer system 500 may release the transcoder assigned to transcoding the source streaming content associated with the live stream channel. The released transcoder may then be returned to the pool of available transcoders for use elsewhere within the intelligent video streaming system.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture, but instead can be implemented on any suitable hardware, firmware, and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added, and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A system for intelligent video streaming comprising:
a user device in communication with a service provider network, the user device generating a playback request for a live stream in response to a user selection to view a channel associated with live stream;
a video controller in communication with the user device and accessible over the service provider network, the video controller comprising:
at least one processor;
non-transitory computer readable media having encoded thereon computer software comprising a set of instructions executable by the at least one processor to:
allocate at least a first transcoder of a pool of transcoders to be continuously active based on analysis of viewing history of a plurality of users;
receive, from the user device, the playback request for the live stream;
determine, from the playback request, whether source streaming content for the live stream is being transcoded; and
allocate, in response to determining that the source streaming content is not being transcoded, an available transcoder from the pool of transcoders to join a multicast stream and transcode the source streaming content;
wherein the available transcoder of the pool of available transcoders further comprises:
at least one processor;
non-transitory computer readable media having encoded thereon a set of instructions executable by the at least one processor to:
generate a join request for the multicast stream of the source streaming content;
join the multicast stream;
retrieve, from the multicast stream, the source streaming content;
transcode the source streaming content for viewing by the user device; and
provide transcoded streaming content for delivery to the user device.

2. The system of claim 1, wherein the video controller further comprises instructions to return, to the user device, in response to receiving the playback request, a pre-roll video playlist, wherein the pre-roll video playlist indicates one or more videos to be played before the requested stream is provided to the user device.

3. The system of claim 2, wherein the pre-roll video playlist includes one or more of a dynamic advertisement, static advertisement, static video, or other live stream.

4. The system of claim 1, wherein the video controller further comprises instructions to track how many transcoders of the pool of available transcoders are in use.

5. The system of claim 4, wherein the video controller further comprises instructions to generate an alert if a number of available transcoders in the pool of available transcoders falls below a threshold.

6. The system of claim 4, further comprising at least one transcoder host machine, wherein the transcoders comprise virtualized transcoder instances hosted on the transcoder host machine, wherein the video controller further comprises instructions to dynamically scale the number of virtualized transcoder instances provisioned on the at least one transcoder host machine according to load requirements.

7. The system of claim 1, wherein the video controller further comprises instructions to assign idle transcoders in the pool of available transcoders to transcode at least one of video on demand content or adaptive bitrate streaming content, wherein the idle transcoder is an available transcoder that may be dynamically requested by the video controller, wherein in response to being requested, the idle transcoder will switch from transcoding the at least one of video on demand content or adaptive bitrate streaming content to transcoding the source streaming content for the content stream.

8. The system of claim 1, wherein:
the video controller further comprises instructions, which, when executed by the at least one processor, cause the video controller to:
determine that no user devices are viewing the transcoded streaming content of the live stream for a first threshold period;
determine that no requests for the live stream have been received from any user devices for a second threshold period; and
release the available transcoder, in response to determining that no user devices have viewed the transcoded streaming content of the live stream for the first threshold period, and that no requests for the live stream have been received for the second threshold period.

9. An intelligent video streaming controller comprising:
at least one processor; and
non-transitory computer readable media having encoded thereon computer software comprising a set of instructions executable by the at least one processor to:
allocate at least a first transcoder of a pool of transcoders to be continuously active based on analysis of viewing history of a plurality of users;
receive, from a user device, a playback request for a live stream associated with a channel selected by the user device;
determine, from the playback request, whether the source streaming content for the live stream is being transcoded;
allocate, in response to determining that the source streaming content is not being transcoded, an available transcoder from the pool of transcoders;
identify, based on the playback request, a multicast stream for the source streaming content;
retrieve, via the available transcoder, the source streaming content from the multicast stream;
transcode, via the available transcoder, the source streaming content; and
provide, via the available transcoder, transcoded streaming content for delivery to the user device.

10. The video controller of claim 9, further comprising instructions to return, to the user device, in response to receiving the playback request, a pre-roll video playlist, wherein the pre-roll video playlist indicates one or more videos to be played before the requested stream is provided to the user device.

11. The video controller of claim 9, further comprising instructions to track how many transcoders of the pool of available transcoders are in use.

12. The video controller of claim 11, further comprising instructions to generate an alert if a number of available transcoders in the pool of available transcoders falls below a threshold.

13. The video controller of claim 11, wherein the pool of available transcoders comprise virtualized transcoder instances hosted on a transcoder host machine including the available transcoder, wherein the video controller further comprises instructions to dynamically scale the number of virtualized transcoder instances provisioned on the at least one transcoder host machine according to load requirements.

14. The video controller of claim 9, further comprising instructions to assign idle transcoders in the pool of available transcoders to transcode at least one of video on demand content or adaptive bitrate streaming content, wherein the idle transcoder is an available transcoder that may be dynamically requested by the video controller, wherein in response to being requested, the idle transcoder will switch from transcoding the at least one of video on demand content or adaptive bitrate streaming content to transcoding the source streaming content for the content stream.

15. The video controller of claim 9, further comprising instructions to:
determine that no user devices are viewing the transcoded streaming content of the live stream for a first threshold period;
determine that no requests for the live stream have been received from any user devices for a second threshold period; and
release the available transcoder, in response to determining that no user devices have viewed the transcoded streaming content of the live stream for the first threshold period, and that no requests for the live stream have been received for the second threshold period.

16. A method for intelligent video streaming services comprising:
allocating at least a first transcoder of a pool of transcoders to be continuously active based on analysis of viewing history of a plurality of users;
receiving, at a video controller, a playback request for a live stream, the playback request generated by a user device in response to a selection to view a channel associated with the live stream;
determining, at the video controller, whether source streaming content for the live stream is being transcoded;
allocating, in response to determining that the source streaming content is not being transcoded, an available transcoder from the pool of transcoders;
retrieving, via the available transcoder, the source streaming content from a multicast stream of the source streaming content;
transcoding, via the available transcoder, the source streaming content for viewing by the user device; and
providing, via the transcoder, transcoded streaming content for delivery to the user device.

17. The method of claim 16, further comprising:
returning, via the video controller, in response to receiving the playback request, a pre-roll video playlist to the user device, wherein the pre-roll video playlist indicates one or more videos to be played before the requested stream is provided to the user device; and retrieving, with the user device, the one or more videos of the pre-roll video playlist.

18. The method of claim 16, further comprising:
providing a transcoder host machine;
provisioning, via the transcoder host machine, one or more virtualized transcoder instances;
tracking, with the video controller, virtualized transcoder instance usage; and
scaling, at the transcoder host machine, the number of virtualized transcoder instances according to load requirements for additional virtualized transcoder instances;
wherein the transcoder host machine hosts the pool of available transcoders, the pool of available transcoders having a plurality of virtualized transcoder instances including the available transcoder.

19. The method of claim 16, further comprising:
assigning, via the video controller, idle transcoders in the pool of available transcoders to transcode at least one of video on demand content or adaptive bitrate streaming content, wherein the idle transcoder is an available transcoder that may be dynamically requested by the video controller, wherein in response to being requested, the idle transcoder will switch from transcoding the at least one of video on demand content or adaptive bitrate streaming content to transcoding the source streaming content for the content stream.

20. The method of claim 16 further comprising:
determining, with the video controller, that no user devices are viewing the transcoded streaming content of the live stream for a first threshold period;
determining, with the video controller, that no requests for the live stream have been received from any user devices for a second threshold period; and
releasing, with the video controller, the available transcoder, in response to determining that no user devices have viewed the transcoded streaming content of the live stream for the first threshold period, and that no requests for the live stream have been received for the second threshold period.

21. The method of claim 16, wherein the available transcoder is the first transcoder.

* * * * *